March 28, 1961  D. J. MacGREGOR  2,977,520
SYNCHRONOUS MOTOR CONTROL
Filed May 7, 1959

INVENTOR
Dean J. MacGregor
BY
Paul E. Friedemann
ATTORNEY

United States Patent Office 2,977,520
Patented Mar. 28, 1961

2,977,520

SYNCHRONOUS MOTOR CONTROL

Dean J. MacGregor, Amherst, N.Y., assignor to Westinghouse Electric Corporation, East Pittsburgh, Pa., a corporation of Pennsylvania Filed May 7, 1959, Ser. No. 811,666

13 Claims. (Cl. 318—170)

This invention relates to synchronous motor controls and more particularly to a system of control for pull-out protection for a synchronous motor.

Conventional pull-out protection systems for a synchronous motor utilize electromechanical relay devices, which have many disadvantages. The relay is subject to variations in its performance due to vibration, shock, or contaminated atmospheres. Considerable mounting space is required for electromechanical relays, which space is often at a premium. The rate of response of the conventional pull-out protection system is quite often inadequate to satisfactorily protect the motor.

Conventional pull-out protection circuits often experience false operation when transient voltages appear on the power supply lines, but the motor has not actually slipped out of synchronization. Conventional pull-out protection circuits will often fail to discriminate between a true overload condition and overloads of short duration which induce an alternating current in the field winding, but which are temporary in nature and not of sufficient duration to actually cause pull-out of the motor.

One object of this invention is to provide a system of electrical controls for a synchronous motor having a new and improved pull-out detection circuit responsive to the magnitude and frequency of the alternating current induced in the motor field winding during pull-out.

Another object of this invention is to provide a pull-out protection circuit for a synchronous motor control system capable of discriminating between transient conditions existing upon the power lines and bona fide pull-out conditions.

Another object of this invention is to provide a pull-out detection scheme for a synchronous motor having static elements permitting finer adjustment, improved reliability and sensitivity, and considerably less space than conventional pull-out protection schemes.

Figure 1:
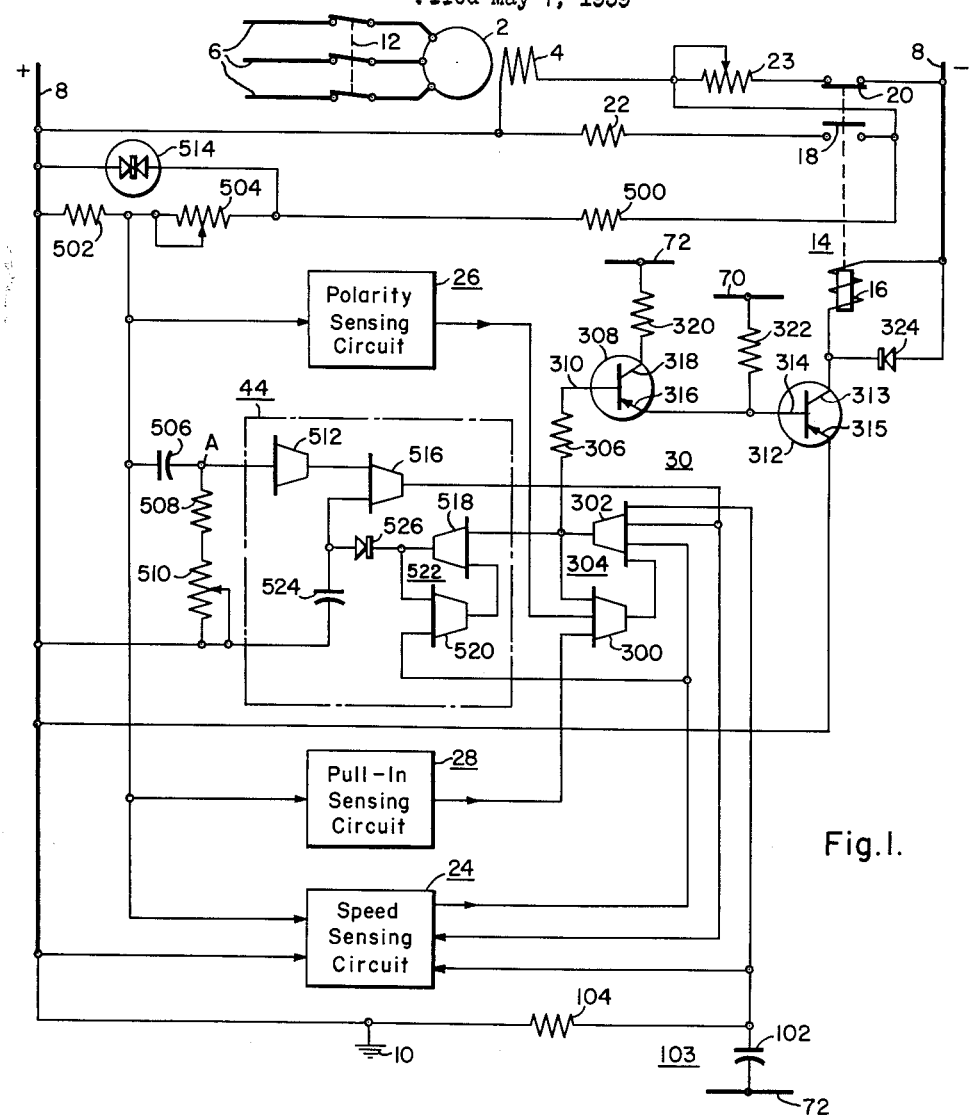
Figure 2:
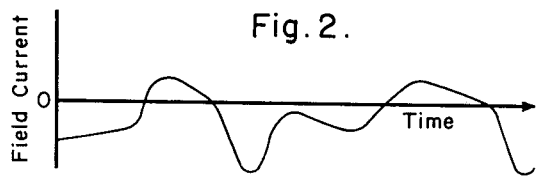
Figure 2A:
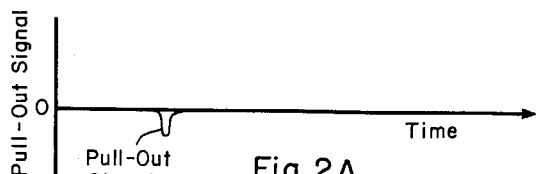

Further objects and advantages of this invention will be readily apparent from the following detailed description taken in conjunction with the accompanying drawing, in which:

Fig. 1 is a schematic diagram of an illustrative embodiment of this invention; and Fig. 2 is an oscillographic representation of the current in the field winding of the synchronous motor during pull-out conditions, while Fig. 2A is an oscillographic representation of the pull-out signal as it occurs in relation to the field current.

The invention is shown embodied in an electrical control system for a synchronous motor 2 having a field winding 4. The alternating current power supply is indicated by the power supply leads 6 while the direct current supply of excitation is represented by the excitation leads 8. The excitation leads 8 are illustrated to have a polarity as shown in the drawing with the positive lead connected to the ground 10. A field contactor 14, having an operating coil 16 and make contact 20, furnishes means for connecting the field winding 4 to the excitation source. A conventional field discharge resistor 22 is arranged to be connected across the field winding 4 by the back contact 18 of the field contactor 14 when the field excitation is disconnected from the field winding 4. The field contactor 14 is shown in its energized position with the normally closed back contact 18 in open position and the normally open contact 20 in closed position.

It will be of considerable assistance in understanding the pull-out protection scheme by first considering how the field contactor 14 is energized to connect to the field winding 4 across leads 8. For this purpose several circuits are utilized, namely a speed sensing circuit 24, a polarity sensing circuit 26, a pull-in sensing circuit 28 and an amplifier and power switching circuit shown generally at 30. The circuits 24, 26, and 28 are connected to respond to the current induced in the field winding 4 during starting. Upon occurrence of optimum conditions for synchronization these circuits provide a desired combination of signals to the power amplification and switching circuit 30 to initiate energization of the field contactor 14. The present invention provides a pull-out protection scheme for deenergizing the field contactor 14 when the motor becomes overloaded and a pull-out occurs.

The circuits 24, 26, 28, and 30 as well as the pull-out protection scheme utilize a logic function commonly known to those skilled in the art as the NOR logic function or NOR element. A NOR logic function is performed by a circuit apparatus which is adapted to provide an output in the absence of an input to the circuit apparatus. Should one input or more be present to the NOR logic function, then no output will result. For purposes of illustration, the NOR elements have been chosen to be responsive only to input signals of negative polarity. A flip-flop or Memory element is formed by the appropriate connection of a pair of NOR elements. The resulting Memory element is a bistable device which is capable of being triggered to assume one state and remain in that state even after removal of the triggering influence. The Memory element will assume its opposite state when an appropriate second input is applied to it and will remain in the opposite state even after removal of the second input. For a further description of the operation and characteristics of a NOR logic circuit and a Memory logic circuit, reference is made to a publication entitled, "Static Switching Devices," by Robert A. Mathias, in "Control Engineering," May 1957. Of course, any suitable form of NOR element or Memory element may be used as more fully explained in the cited article and my previously mentioned copending application.

One such Memory element comprising a NOR element 300 and a NOR element 302 is as indicated by the reference character 304 in the power switching and amplification circuit 30. That is, an output of the NOR element 300 is connected to an input of the NOR element 302 and an output from the NOR element 302 is connected to an input of the NOR element 300. Prior to closing the line contactors 12 upon start-up of the motor, the Memory element 304 is pulsed to an initial desired state. For this purpose, a capacitor 102 is connected in electrical series connection with a limiting resistor 104 between a negative bus bar 72 and ground 10. When the negative bus bar 72 is energized prior to energization of the motor, the capacitor 102 changes through resistor 104 and the resulting negative voltage constitutes an input pulse to the NOR element 302 preventing the NOR element 302 from producing an output. Since the output from the NOR element 302 is connected to be fed back to an input of the NOR element 300, and since no output is present from the NOR element 302, an output results from the NOR element 300 which prevents the NOR element 302 from producing an output even though the input pulse from the capacitor 102 is removed. As a result no output is obtained from the Memory element 304 and the operating coil 16 of the field contactor 14 will not be energized to its closed position prior to start-up of the motor. In a similar manner, Memory logic functions in the speed sensing circuit 24 are pulsed, but instead, to have a resultant output which is connected to an input of the NOR element 302 within the Memory element 304. The polarity sensing circuit 26 is connected to provide an input to the NOR element 300 and the pull-in sensing circuit 28 is connected to provide another input to the NOR element 300.

During start-up when the motor reaches proper speed for synchronization, the speed sensing circuit 24 is switched to have no output and when an input occurs to the NOR element 300 from either the polarity sensing circuit 26 or the pull-in sensing circuit 28, the NOR element 302 will have no input signals and an output will result therefrom. The output signal from the NOR element 302 is applied through an isolating resistor 306 to a first transistor 308 through its base electrode 310. In addition, the transistor 308 has a collector electrode 318 and an emitter electrode 316. The collector electrode 318 is connected to the negative bus 72 through a load resistor 320.

A power transistor 312 is connected with its base electrode 314 connected to the emitter electrode 316 of the transistor 308. The power transistor 312 also has a collector electrode 313 and an emitter electrode 315. The emitter electrode 316 as well as the base electrode 314 are positively biased through a resistor 322 connected to a positive bus bar 70.

When the output signal from the NOR element 302 appears at the base electrode 310 the transistor 308 is made conductive, simulating a switch in the closed position, thereby drawing current from the base electrode 314 of the power transistor 312. The power transistor 312 becomes conductive and simulates a switch in the closed position with the result that the operating coil 16 of the field relay 14 is energized by the excitation voltage across the excitation leads 8 causing the contactor 14 to operate thereby closing the normally opened contacts 20 and opening the normally closed contacts 18. In such a manner direct current excitation is applied to the field winding 4. A rectifier 324 is connected in parallel across the operating coil 16 to protect the coil from excessive switching surges that may occur when the power transistor 312 becomes non-conductive.

Once the motor is operating at synchronous speed it is necessary that pull-out conditions on the motor be detected so the motor may either be disconnected or a resynchronization circuit initiated to bring the motor once more up to speed. In accordance with this invention a pull-out protection circuit 44 provides upon pull-out an input signal to the NOR element 302 which in turn removes the output from the NOR element 302 and the voltage appearing at the base electrode 310. The operating coil 16 is deenergized and the field contactor 14 disconnects the field winding 4 from the excitation source 8.

To provide an input signal to the NOR element 302 when a pull-out condition occurs, a NOR element 512 is connected to respond to the induced alternating current in the field winding 4. The output from the NOR element 512 provides an input to a second NOR element 516. The NOR element 512 has been chosen to be responsive to an input signal voltage of negative polarity only.

To obtain a measure of the induced current in the field winding 4 a voltage divider circuit consisting of a resistor 500, resistor 502, and a potentiometer 504 is connected in series across the field winding 4. The flow of induced current through the resistor 502 provides a signal voltage which is in phase with the induced current. A field control rheostat 23 is shown connected in series with the field winding 4 in the voltage divider circuit. The signal voltage is applied across a differentiating circuit composed of a capacitor 506 in electrical series connection with a resistor 508 and a potentiometer 510 to ground 10. The NOR element 512 is connected to receive an input signal from point A located between the capacitor 506 and the resistor 508.

It is well known that when a synchronous motor pulls out of step an alternating current is superimposed on the direct current excitation across the field winding 4. During normal operation, the capacitor 506 is charged to the level of the signal voltage. Upon occurrence of pull-out condition, during the negative half cycle of the induced alternating current, as when the current flow through the resistor 502 is toward ground 10, the capacitor 506 must discharge to ground 10 so the input signal at point A to the NOR element 512 is of positive polarity. It will be recalled however, that the NOR element 512 has been chosen to be responsive only to a negative input signal. Upon occurrence of the positive half wave of the induced alternating current, point A will provide a negative input signal since current will flow from ground 10 to point A causing the NOR element 512 to remove its output. When the NOR element 512 removes its output the NOR element 516 will provide an output signal indicating pull-out conditions to the power switching and amplifier circuit 30. Hence, a pull-out signal will occur upon application of an overload of sufficient magnitude and duration as illustrated in Figs. 2 and 2A. The field contactor 14 is deenergized and returns to its normal position. At the same time the output from the NOR element 516 in the pull-out protection circuit 44 supplies an input to the speed sensing circuit 24 to reset the Memory logic functions in that circuit in preparation for a resynchronization sequence if desired. Of course, resynchronization will not be necessary if it is desired that the motor be shut down upon occurrence of a pull-out condition. If this is desired, appropriate means may be used to open the line contactors 12 removing the motor from the power supply lines 6.

It is to be noted that during start-up, immediately after application of the excitation voltage to the field winding 4, the capacitor 506 will charge to a voltage level determined by the resistor 502 and the potentiometer 504, but thereafter there is no voltage across the resistive elements 508 and 510. During synchronization when excitation is applied to the field winding 4 a stray input to the NOR element 512 will result while the capacitor 506 is charging, but thereafter since there is no voltage across the resistive elements 508 and 510 there is no further input to the NOR element 512.

Means, however, must be provided to block any pull-out signal from the pull-out protection circuit 44 during the normal synchronizing period. To this end, a Memory element 522 is formed by a NOR element 518 and a NOR element 520 which have cross connected inputs and outputs similar to the Memory element 304 described previously. The Memory element 522 serves to block a pull-out signal from the circuit 44 during a normal synchronizing period. The Memory element 522 is initially pulsed to have a resulting output from the NOR element 518 before the motor is started. The input pulse is provided by the speed sensing circuit 24 when the circuit 24 is pulsed to its proper state by the capacitor 102 and resistor 104 being connected to the negative bus bar 72. A capacitor 524 is connected to be charged by the output from the NOR element 518 through a rectifier 526. At the same time, the NOR element 518 provides an input to the NOR element 516 thereby blocking any pull-out signal from the NOR element 516 while the motor is being brought up to speed. Upon attainment of the proper synchronizing conditions the NOR element 302 in the power switching and amplifier circuit 30 provides an input to the NOR element 518 which switches the Memory element 522 to zero output at the instant of field application. The capacitor 524, however, must discharge through the NOR element 516 since the diode rectifier 526 blocks the charging path. In such a manner an input to the NOR element 516 is provided for a sufficient interval of time to prevent the transients incident to synchronization from actuating the pull-out circuit 44 to have an output. After the capacitor 524 discharges, only the output from the NOR element 512 blocks a pull-out signal from the circuit 44 and such a pull-out signal will occur when a negative input signal of sufficient magnitude appears at point A as previously described.

Conventional pull-out protection circuits often indicate a pull-out condition when transient voltages exist on the power supply lines, but the motor has not actually slipped out of synchronization. My invention provides means for adjusting the sensitivity of the pull-out protection circuit so that these transient conditions will not cause a pull-out signal. To this end, the potentiometer 510 provides a sensitivity adjustment which will determine the magnitude and frequency of the induced alternating current in the field winding 4 capable of making the pull-out signal appear. If the signal voltage appearing across the capacitor 506 is rapidly altered, the rate of change of voltage will be relatively large in the differentiating circuit and the transient current flowing through the resistive elements 508 and 510 will be relatively large. By adjusting the value of the resistance in the potentiometer 510 the transient current flowing from ground 10 to point A and the negative plate of the capacitor 506, can be adjusted in magnitude. The NOR element 512 is chosen to be responsive to a negative potential of at least a few volts magnitude. Thus, upon occurrence of transient conditions of insufficient magnitude to warrant the pull-out indication, insufficient input signal will occur at the NOR element 512 to cause it to switch its state.

Occasionally large switching surges, as may occur during transient fault conditions on the power supply lines 6, may appear across the field winding 4. To protect the pull-out protection circuit 44 from these surges a non-linear resistor 514 is connected across the resistor 502 and potentiometer 504. It is to be understood that a non-linear resistor has the characteristic of drawing more than a proportional amount of current as the voltage across it increases. In other words, the non-linear resistor 514 becomes highly conductive upon the occurrence of high voltage surges thus causing the entire high potential surge to appear across the resistor 500 and in this manner protects the pull-out detection circuit 44 from damaging high potential surges.

The present invention provides a pull-out protection circuit for an electrical control circuit for a synchronous motor which is capable of quickly responding to a pull-out condition. At the same time means are provided for adjusting the sensitivity of the pull-out protection circuit so that it will be capable of overriding variations in the induced alternating current of the field winding 4 which may occur when an overload temporarily appears upon the synchronous motor and is removed prior to pull-out. Large switching surges as may occur during transient fault conditions on the power lines 6 are made to bypass the pull-out protection circuit. Transients incident to synchronizing the motor are also rendered ineffective in activating the circuit. Improved reliability and sensitivity are obtained by the use of static elements permitting finer adjustment and requiring considerably less space than conventional electromechanical relay pull-out systems.

Various modifications are possible within the spirit and scope of this invention. Static control means capable of interrupting and switching the excitation voltage may be employed in place of the field contactor 14. The transistors have been illustrated to be of the PNP type, but NPN transistors may be used with suitable changes of polarity. The pull-out circuit would then be responsive to the negative half cycles of induced current in the field winding. These alterations and substitutions are merely by way of example. Although a particular embodiment of the invention has been shown for the purpose of illustration, it is to be understood that the invention is not limited to the specific arrangements shown, but includes all equivalent embodiments, modifications and substitutions within the spirit and scope of this invention.

I claim as my invention:

1. In a pull-out protection circuit for a synchronous alternating current motor having a field winding adapted to be connected to an excitation source, comprising in combination, a first NOR element, means responsive to the output of said first NOR element for disconnecting the field winding from the excitation source, a second NOR element operably connected to the field winding and providing an input to said first NOR element only during each half cycle of predetermined polarity of the induced current in the field winding, and means for bypassing said second NOR element and providing said first NOR element with an input during synchronization of the motor.

2. In a pull-out protection circuit for a synchronous alternating current motor having a field winding adapted to be connected to an excitation source, comprising in combination, a first NOR element, means responsive to the output of said first NOR element for disconnecting the field winding from the excitation source, a second NOR element connected to provide an input to said first NOR element, means for obtaining a signal voltage responsive to the induced current in the field winding, means for differentiating the signal voltage providing an input voltage to said second NOR element, means for adjusting the magnitude of said input voltage, said second NOR element responsive only to an input voltage exceeding a predetermined magnitude and having a predetermined polarity.

3. In a pull-out protection circuit for a synchronous alternating current motor having a field winding adapted to be connected to an excitation source comprising, in combination, a first NOR element, means responsive to the output of said first NOR element for disconnecting the field winding from the excitation source, a second NOR element operably connected to the field winding providing an input to said first NOR element only during each half cycle of predetermined polarity of the induced current in the field winding, a Memory element, means for pulsing said Memory element to provide said first NOR element with an input prior to connecting the field winding to the excitation source, and time delay means providing said first NOR element with an input during the existence of transients incident to connecting the field winding to the excitation source.

4. In a pull-out protection circuit for a synchronous alternating current motor having a field winding adapted to be connected to excitation source comprising in combination, a first NOR element, means responsive to the output of said first NOR element for disconnecting the field winding from the excitation source, a Memory element providing said first NOR element with an input prior to connecting of the field winding to the excitation source, time delay means responsive to the connecting of the field winding for providing an input to the first NOR element for a predetermined period, a second NOR element, and means responsive to the induced current in said field winding for providing a transient voltage input to said second NOR element, said second NOR element providing an input to said first NOR element when said transient voltage input is of a predetermined polarity and magnitude.

5. In a pull-out protection circuit for a synchronous alternating current motor having a field winding adapted to be connected to an excitation source; a first NOR circuit means and a second NOR circuit means, each said NOR circuit means being operative to produce an output unless an input is applied to said NOR circuit means; said first NOR circuit means connected to receive the output of said second NOR circuit means as a first input; first input means for providing an input to said second NOR circuit means representative of the polarity of the induced current in the field winding; second input means for deriving a second input to said first NOR circuit means prior to connection of said field winding to the excitation source; third input means for deriving a third input to said first NOR circuit means representative of the lapse of a predetermined time delay after connection of said field winding to the excitation source; and means responsive to the output from said second NOR circuit means for disconnecting said field winding from the excitation source.

6. In a pull-out protection circuit for a synchronous alternating current motor having a field winding adapted to be connected to an excitation source; a first NOR circuit means, a second NOR circuit means, and a first Memory circuit means, each said NOR circuit means being operative to produce an output unless an input is applied to said NOR circuit means; said Memory circuit means having one of two output states dependent on the last of a plurality of inputs supplied to the Memory circuit means, said first NOR circuit means connected to receive the output of said second NOR circuit means as a first input; first input means for providing an input to said second NOR circuit means representative of the polarity of the induced current in the field winding; means for providing a first input to said Memory circuit means upon initiation of start-up of the motor to reset the Memory circuit means to an initial output state prior to application of the excitation source to the field winding; said first NOR circuit means connected to receive the initial output state of said Memory circuit means as a second input; means for providing a second input to said Memory circuit means upon application of the excitation source to the field winding to switch output states of said Memory circuit means; delay means responsive to the switching of said Memory circuit means for providing a third input to said first NOR circuit for a predetermined period; and means responsive to the output from said second NOR circuit means for disconnecting said field winding from the excitation source.

7. In a pull-out protection circuit for a synchronous alternating current motor having a field winding adapted to be connected to an excitation source; a first NOR circuit means, a second NOR circuit means, and a first Memory circuit means, each said NOR circuit means being operative to produce an output unless an input is applied to said NOR circuit means; said Memory circuit means having one of two output states dependent on the last of a plurality of inputs supplied to the Memory circuit means, said first NOR circuit means connected to receive the output of said second NOR circuit means as a first input; first input means for providing an input to said second NOR circuit means representative of the polarity and magnitude of the induced current in the field winding; said first input means including means for adjusting the magnitude of induced current necessary for an input to said second NOR circuit means to result; means for providing a first input to said Memory circuit means upon initiation of start-up of the motor to reset the Memory circuit means to an initial output state prior to application of the excitation source to the field winding; said first NOR circuit means connected to receive the initial output state of said Memory circuit means as a second input; means for providing a second input to said Memory circuit means upon application of the excitation source to the field winding to switch output states of said Memory circuit means; delay means responsive to the switching of said Memory circuit means for providing a third input to said first NOR circuit for a predetermined period; and means responsive to the output from said second NOR circuit means for disconnecting said field winding from the excitation source.

8. In a pull-out protection circuit for a synchronous alternating current motor having a field winding adapted to be connected to an excitation source; a first NOR circuit means, a second NOR circuit means, and a first Memory circuit means, each said NOR circuit means being operative to produce an output unless an input is applied to said NOR circuit means; said Memory circuit means having one of two output states dependent on the last of a plurality of inputs supplied to the Memory circuit means, said first NOR circuit means connected to receive the output of said second NOR circuit means as a first input; first input means for providing an input to said second NOR circuit means representative of the polarity and magnitude of the induced current in the field winding; said first input means including means for establishing a minimum magnitude of induced current for an input to said second NOR circuit means and means for by-passing said first circuit means upon occurrence of a magnitude of induced current above a predetermined level; means for providing a first input to said Memory circuit means upon initiation of start-up of the motor to reset the Memory circuit means to an initial output state prior to application of the excitation source to the field winding; said first NOR circuit means connected to receive the initial output state of said Memory circuit means as a second input; means for providing a second input to said Memory circuit means upon application of the excitation source to the field winding to switch output states of said Memory circuit means; delay means responsive to the switching of said Memory circuit means for providing a third input to said first NOR circuit for a predetermined period; and means responsive to the output from said second NOR circuit means for disconnecting said field winding from the excitation source.

9. In a pull-out protection circuit for a synchronous alternating current motor having a field winding adapted to be connected to an excitation source comprising, in combination, a first NOR element, means responsive to the output of said first NOR element for disconnecting the field winding from the excitation source, a second NOR element operably connected to the field winding and providing an input to said first NOR element only during each half cycle of predetermined polarity of the induced current in the field winding, a Memory element having two output states and an input means, means for applying a signal to said input means triggering the Memory element to an initial output state, means for switching said memory element to the opposite state when the excitation source is connected to the field winding, time delay means responsive to the switching of said Memory element to the opposite state for providing an input to said first NOR element after a predetermined time delay, said first NOR element having an output after expiration of said time delay and in the absence of an input from said second NOR element, the output from said first NOR element indicating a pull-out condition as well as providing an input signal to said input means switching the Memory element to its initial state.

10. In a pull-out protection circuit for a synchronous alternating current machine having a field winding adapted to be connected to an excitation source comprising, in combination, first NOR element, means responsive to the output of said first NOR element for disconnecting the field winding from the excitation source, a second NOR element operably connected to the field winding and providing an input to said first NOR element only during each half cycle of predetermined polarity of the induced current in the field winding, means for adjusting the magnitude of said input to the first NOR element, said first NOR element responsive only to an input of predetermined magnitude, a Memory element having an input means and reset means and two output states, means for providing a pulse to said reset means prior to start-up of the motor, capacitive means responsive to said initial output state for attaining a predetermined charge potential, speed sensing circuit means for providing an input pulse to said input means switching said Memory element to the opposite output state, said capacitive means responsive to the switching of output states providing a discharge potential to said first NOR element for a predetermined time period, said first NOR element having an output signal indicating a pull-out condition and providing at the same time a signal to said input means switching the Memory element to the initial output state.

11. In a pull-out protection circuit for a synchronous alternating current motor having a field winding adapted to be connected to an excitation source comprising, in combination, means responsive to the induced field current for disconnecting the field winding from the excitation source, means for rendering said first mentioned means inoperative during the synchronizing of the motor, means for rendering said first mentioned means unresponsive to the induced alternating current in the field winding when less than a predetermined magnitude and frequency, and non-linear means responsive to the induced alternating current in the field winding for rendering said first mentioned means unresponsive upon the magnitude of said induced alternating current exceeding a second predetermined magnitude.

12. In a pull-out protection circuit for a synchronous alternating current motor having a field winding adapted to be connected to an excitation source, a first NOR element, means responsive to the output of said first NOR element for indicating that pull-out conditions are present, a second NOR element operably connected to the field winding and providing an input to said first NOR element only when the induced current in the field winding is of predetermined polarity and exceeds a predetermined magnitude, and means for bypassing said second NOR element and providing said first NOR element with an input during synchronization of the motor.

13. In a pull-out protection circuit for a synchronous alternating current motor having a field winding adapted to be connected to an excitation source, a first NOR element, means responsive to the output of said first NOR element for indicating that pull-out conditions are present, a second NOR element operably connected to the field winding and providing an input to said first NOR element only when the induced current in the field winding is of predetermined polarity and exceeds a predetermined magnitude, non-linear means responsive to the induced alternating current in the field winding for rendering said second NOR element inoperative upon the magnitude of said induced alternating current exceeding a greater predetermined magnitude than said first predetermined magnitude, and means for bypassing said second NOR element and providing said first NOR element with an input during synchronization of the motor.

References Cited in the file of this patent

UNITED STATES PATENTS 2,632,875    Bellinger _____ Mar. 24, 1953